United States Patent
Yamaoka et al.

(10) Patent No.: US 11,045,951 B2
(45) Date of Patent: Jun. 29, 2021

(54) CONTROL SYSTEM AND METHOD FOR CONTROLLING DRIVEN BODY

(71) Applicant: Fanuc Corporation, Yamanashi (JP)

(72) Inventors: Nobuaki Yamaoka, Yamanashi (JP); Hajime Suzuki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 258 days.

(21) Appl. No.: 16/373,785

(22) Filed: Apr. 3, 2019

(65) Prior Publication Data
US 2019/0344440 A1 Nov. 14, 2019

(30) Foreign Application Priority Data
May 9, 2018 (JP) .............................. JP2018-090496

(51) Int. Cl.
*B25J 9/16* (2006.01)
*B25J 13/08* (2006.01)

(52) U.S. Cl.
CPC ........... *B25J 9/1653* (2013.01); *B25J 9/1674* (2013.01); *B25J 9/1602* (2013.01); *B25J 13/088* (2013.01)

(58) Field of Classification Search
CPC ........... G05B 2219/39558; G05B 2219/39508; G05B 2219/40053; G05B 2219/40583;
(Continued)

(56) References Cited

U.S. PATENT DOCUMENTS

2008/0177403 A1 7/2008 Masuya et al.
2011/0208356 A1 8/2011 Kato et al.
(Continued)

FOREIGN PATENT DOCUMENTS

CN 107690376 A 2/2018
EP 1947537 A1 7/2008
(Continued)

OTHER PUBLICATIONS

Ishikawa, Kaoru; Notice of Reasons for Refusa.; Japanese Patent Application No. 2018-090496; dated May 26, 2020; 4 pages.
(Continued)

*Primary Examiner* — Robert T Nguyen
*Assistant Examiner* — Dylan M Katz
(74) *Attorney, Agent, or Firm* — Shackelford, Bowen, McKinley & Norton, LLP

(57) ABSTRACT

The control system includes: a driven body driven by a motor; a control apparatus configured to operate the body; and a sensor detecting a state quantity of the body, wherein the control apparatus includes: a storage storing a correction amount for correcting vibration occurring at the mounting position; a control unit configured to generate a command value for the motor in each control cycle based on an operation program, and perform operation control of the body based on the correction amount and the command value; a calculation unit configured to calculate the correction amount; an update unit configured to update the correction amount each time the operation control is performed; and a determination unit configured to determine validity of at least one of an internal parameter and the like of the sensor based on the command value and the state quantity each time the operation control is performed.

6 Claims, 11 Drawing Sheets

(58) Field of Classification Search
CPC ......... G05B 2219/45063; G05B 19/042; B25J 9/1694; B25J 9/0093; B25J 9/1612; B25J 13/085; B25J 15/0625; B25J 13/00; B25J 13/08; B25J 15/0616; B25J 9/1633; B65G 61/00

See application file for complete search history.

(56) References Cited

U.S. PATENT DOCUMENTS

| | | | | |
|---|---|---|---|---|
| 2011/0257785 | A1* | 10/2011 | Nihei | B25J 9/1674 700/254 |
| 2013/0190926 | A1* | 7/2013 | Motoyoshi | B25J 9/1607 700/254 |
| 2014/0230581 | A1* | 8/2014 | Nakatani | B25J 13/085 73/865 |
| 2015/0246442 | A1 | 9/2015 | Cho et al. | |
| 2015/0328770 | A1 | 11/2015 | Motoyoshi et al. | |
| 2016/0030807 | A1* | 2/2016 | Matsumoto | A61B 5/11 600/595 |
| 2017/0087719 | A1* | 3/2017 | Tsuchiya | B25J 9/1651 |
| 2017/0106535 | A1 | 4/2017 | Yamaoka et al. | |
| 2018/0065250 | A1 | 3/2018 | Murakami | |

FOREIGN PATENT DOCUMENTS

| | | | |
|---|---|---|---|
| JP | 2008-176559 | A | 7/2008 |
| JP | 2011-167817 | A | 9/2011 |
| JP | 2011-224727 | A | 11/2011 |
| JP | 2013-013988 | A | 1/2013 |
| JP | 2013000833 | A * | 1/2013 |
| JP | 2013-146827 | A | 8/2013 |
| JP | 2015-163416 | A | 9/2015 |
| JP | 2017-074647 | A | 4/2017 |
| JP | 2018-039039 | A | 3/2018 |

OTHER PUBLICATIONS

Industrial Property Cooperation Center; Search Report by Registered Search Organization; Japanese Patent Application No. 2018-090496; dated Apr. 27, 2020; 8 pages.

* cited by examiner

TIME [sec]

TIME [sec]

CONTROL SYSTEM AND METHOD FOR CONTROLLING DRIVEN BODY

CROSS-REFERENCE TO RELATED APPLICATIONS

This application claims the benefit of Japanese Patent Application No. 2018-090496, the content of which is incorporated herein by reference.

TECHNICAL FIELD

The present invention relates to a control system and a method for controlling a driven body.

BACKGROUND ART

There has been known a control method for correcting vibration and torsion occurring in an arm of a robot when operating the robot (see, e.g., PTL 1). The control method disclosed in PTL 1 calculates a difference between a detection value of an encoder for detecting a rotational angle of a motor for driving the arm, and a detection value of a gyro sensor disposed on the arm. Torsion is corrected through control in consideration of the calculated difference. Since learning control is performed each time the robot is operated, the corrected value is updated each time.

CITATION LIST

Patent Literature

{PTL 1} Japanese Unexamined Patent Application, Publication No. 2013-146827

SUMMARY OF INVENTION

An aspect of the present invention provides a control system including: a driven body driven by a motor; a control apparatus configured to control the motor to operate the driven body; and a sensor mounted on the driven body and configured to detect a state quantity of the driven body at a mounting position, wherein the control apparatus includes: a storage unit configured to store a vibration correction amount for correcting vibration occurring at the mounting position; an operation control unit configured to generate a command value for the motor in each control cycle based on an operation program, and perform operation control of the driven body based on the vibration correction amount stored in the storage unit and the command value; a correction amount calculation unit configured to calculate the vibration correction amount when the operation control is performed by the operation control unit; a correction amount update unit configured to update the vibration correction amount each time the operation control is performed; and a determination unit configured to determine validity of at least one of an internal parameter, the state quantity, the mounting position and posture of the sensor based on the command value and the state quantity each time the operation control is performed.

Another aspect of the present invention provides a method for controlling a driven body including: a step of, based on a state quantity at a mounting position detected by a sensor mounted on the driven body, calculating a vibration correction amount for correcting vibration occurring at the mounting position; a step of storing the calculated vibration correction amount; a step of generating a command value for the driven body in each control cycle based on an operation program, and performing operation control of the driven body based on the stored vibration correction amount and the command value; a step of updating the vibration correction amount each time the operation control is performed; and a step of determining validity of at least one of an internal parameter, the state quantity, the mounting position and posture of the sensor based on the command value and the state quantity each time the operation control is performed.

DESCRIPTION OF EMBODIMENTS

A control system 100 according to an embodiment of the present invention will be described below with reference to the drawings.

Figure 1:
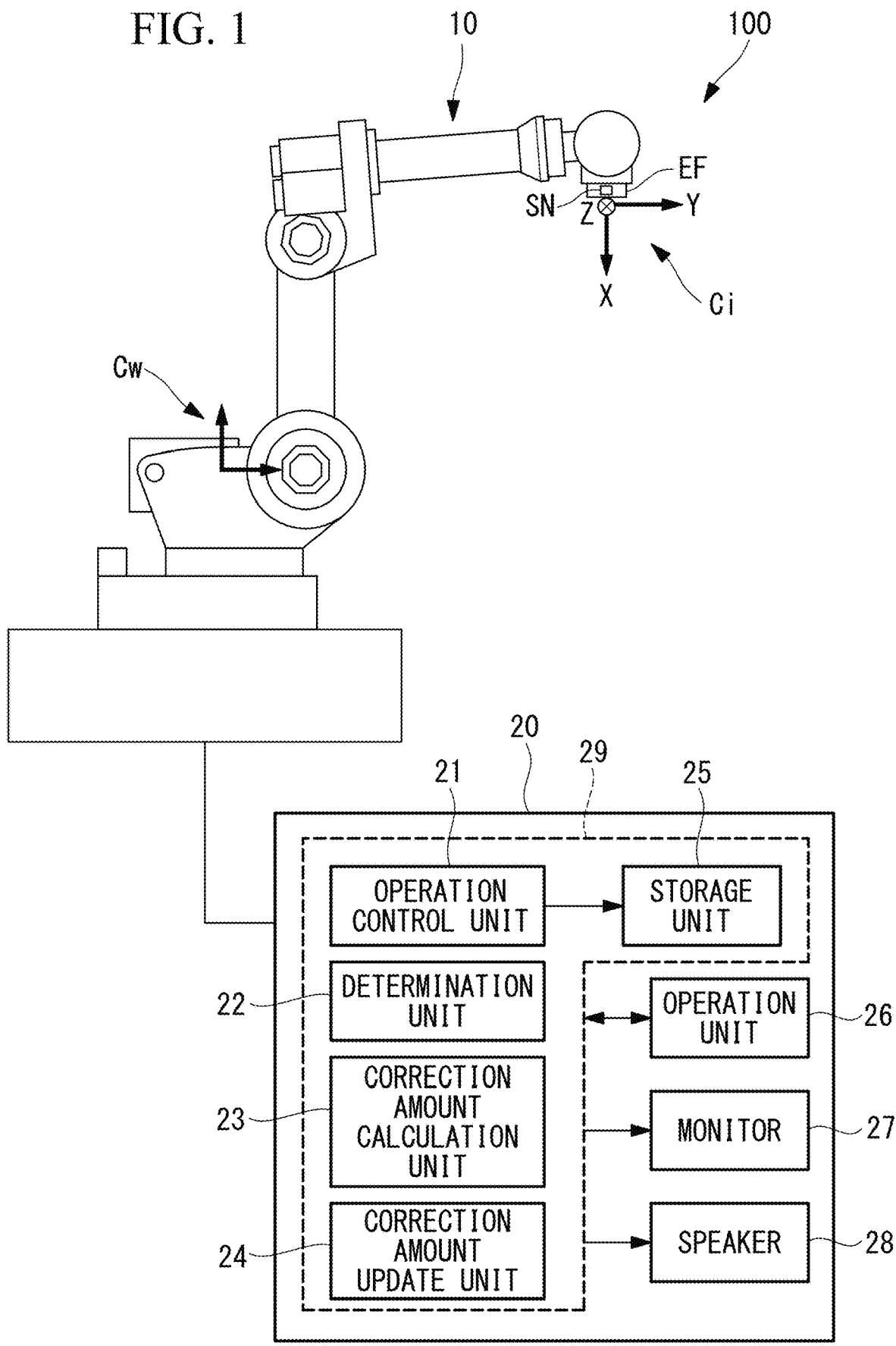
FIG. 1 is a schematic diagram of a control system of the present invention.

FIG. 1 is a schematic diagram for explaining the control system 100. The control system 100 includes a vertical articulated type robot (a driven body: hereinafter simply referred to as "robot") 10 having six articulated shafts, a control apparatus 20 configured to control motion of the robot 10, and an acceleration sensor (sensor) SN mounted on a tip of the robot 10.

The robot 10 has, at a tip position, an end effector EF for carrying out work on a work as a working object. The acceleration sensor SN is mounted on the end effector EF, and detects the acceleration (a state quantity) of the end effector EF at the mounting position. Each articulated shaft of the robot 10 is driven by a motor controlled by the control apparatus 20 to be driven about each rotary axis. Each motor is provided with an encoder for detecting the rotational angle of the motor. A world coordinate system Cw is set in the robot 10, and an interface coordinate system Ci (hereinafter also referred to as a "sensor coordinate system Ci") is set in the end effector EF.

The control apparatus 20 includes a control unit 29 configured to execute various types of control, an operation unit 26 configured to receive a user's operation, a monitor (notification unit) 27 capable of displaying information on control of the robot 10 as an image, and a speaker (notification unit) 28 configured to output sound such as warning notification. The control unit 29 includes a CPU (Central Processing Unit), a ROM (Read Only Memory), a RAM (Random Access Memory), and a memory which are not shown in FIG. 1. By the CPU developing a program stored in the ROM onto the RAM and the memory, the control unit 29 can execute each program function. The operation unit 26 includes a keyboard and a mouse.

As shown in FIG. 1, the control unit 29 includes: a storage unit 25 configured to store an operation program for the robot 10, and a vibration correction amount for correcting vibration occurring in the end effector EF when the end effector EF is operated; an operation control unit 21 configured to drive the motor based on a command value generated according to the operation program read from the storage unit 25; a correction amount calculation unit 23 configured to calculate the vibration correction amount; a correction amount update unit 24 configured to update the calculated vibration correction amount each time the operation program is executed; and a determination unit 22 configured to use an internal parameter such as calibration data of the acceleration sensor SN to determine whether the internal parameter or the like is appropriate each time the operation program is executed.

The correction amount calculation unit 23 calculates sensor acceleration As1 using a detection value of the acceleration sensor SN and the internal parameter of the acceleration sensor SN in order to calculate the vibration correction amount each time the operation program is executed.

Figure 2:
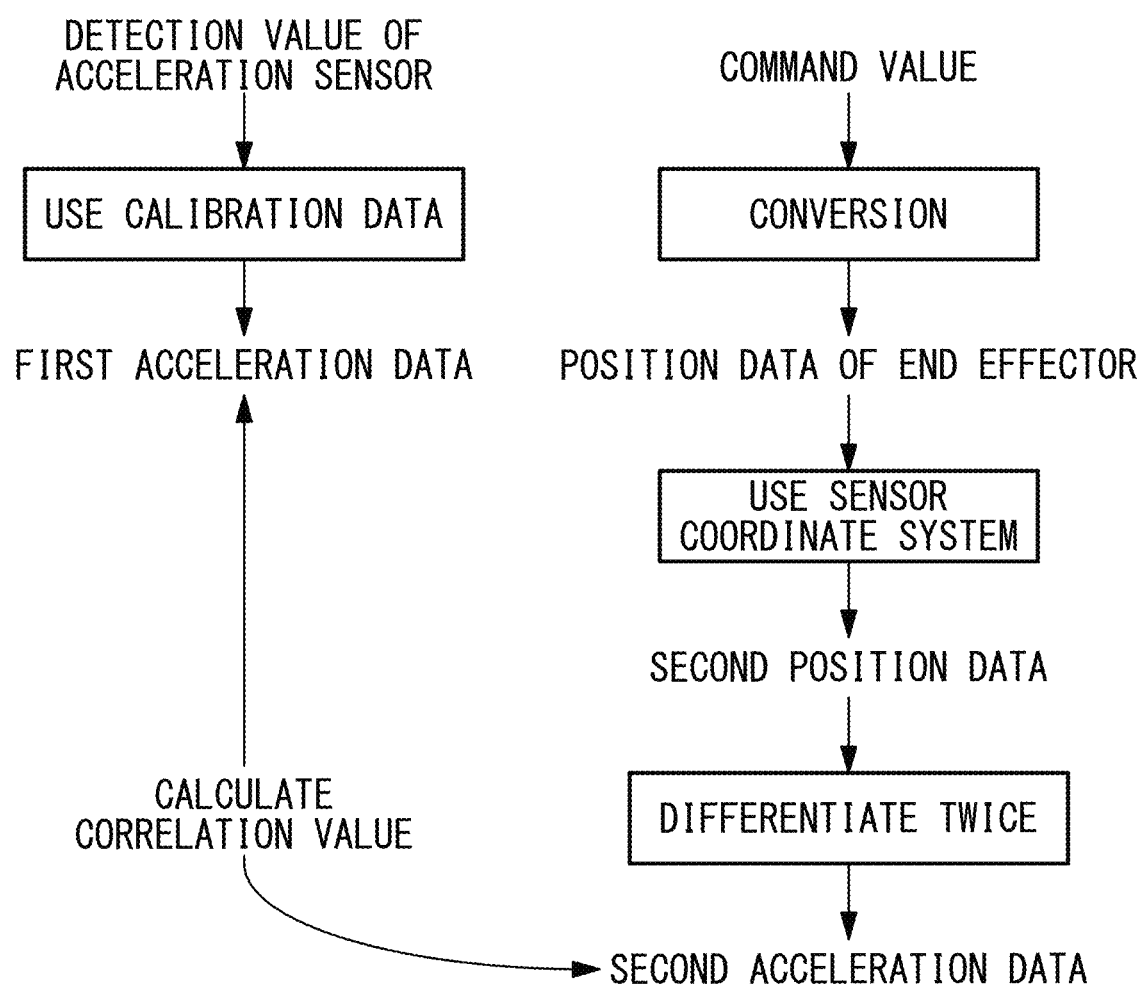
FIG. 2 is a flowchart of a method for calculating first acceleration data, second acceleration data, and a correlation value.

The correction amount calculation unit 23 calculates position data of the end effector EF by converting the command value based on the operation program as shown in FIG. 2. The correction amount calculation unit 23 uses the sensor coordinate system Ci for the calculated position data of the end effector EF to calculate second position data which is position data of the acceleration sensor SN. The correction amount calculation unit 23 differentiates the calculated second position data twice to calculate second acceleration data (second time-series data) Ac.

Figure 3:
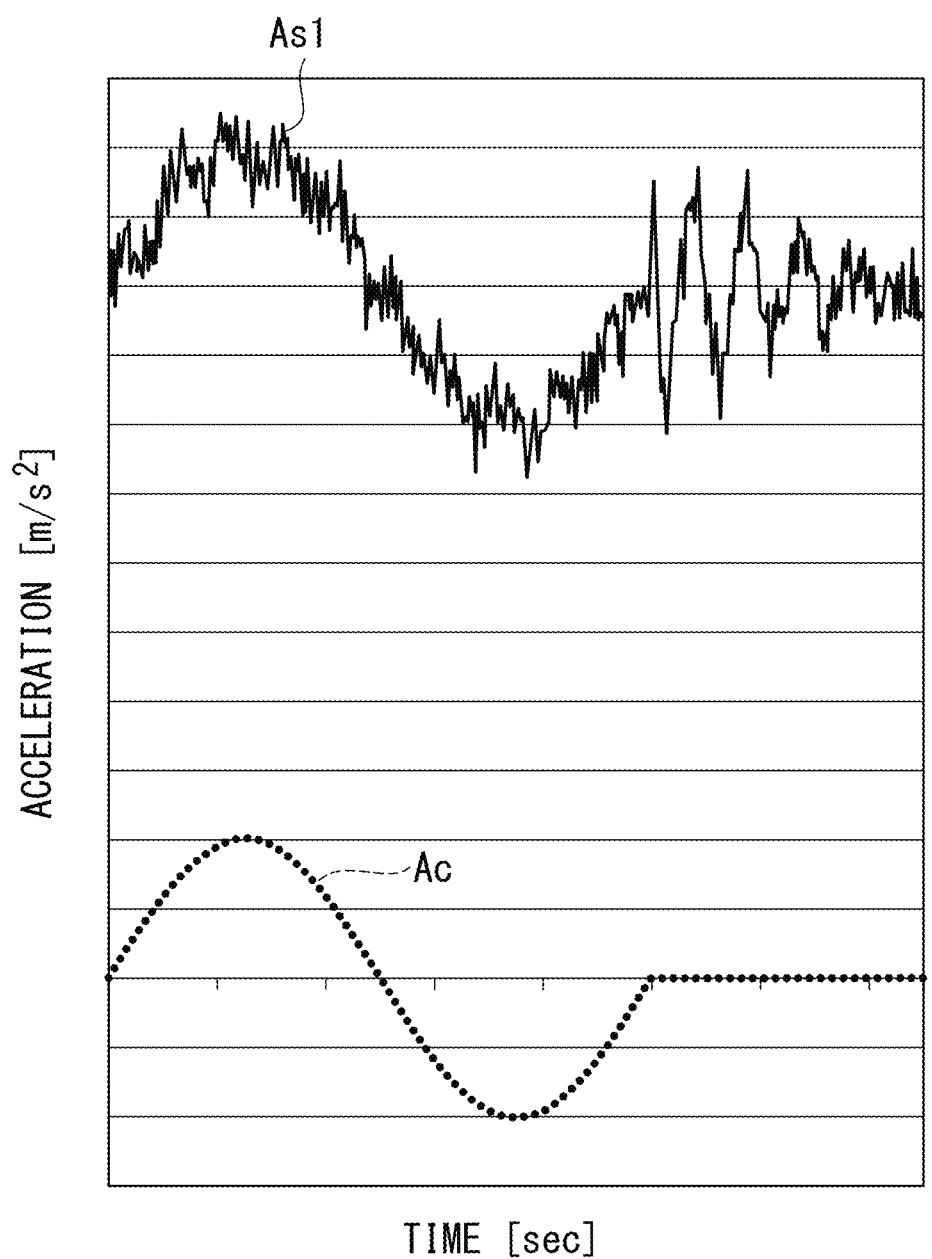
FIG. 3 is graphs showing examples of a detection value of an acceleration sensor and the second acceleration data.

The correction amount calculation unit 23 calculates the vibration correction amount by processing the calculated second acceleration data Ac and the sensor acceleration As1 shown in FIG. 3 detected by the acceleration sensor SN in turn. As shown in FIG. 3, the sensor acceleration As1 has a difference corresponding to the part of gravitational acceleration and the part of vibration in the end effector EF as compared to the second acceleration data Ac.

Figure 4:
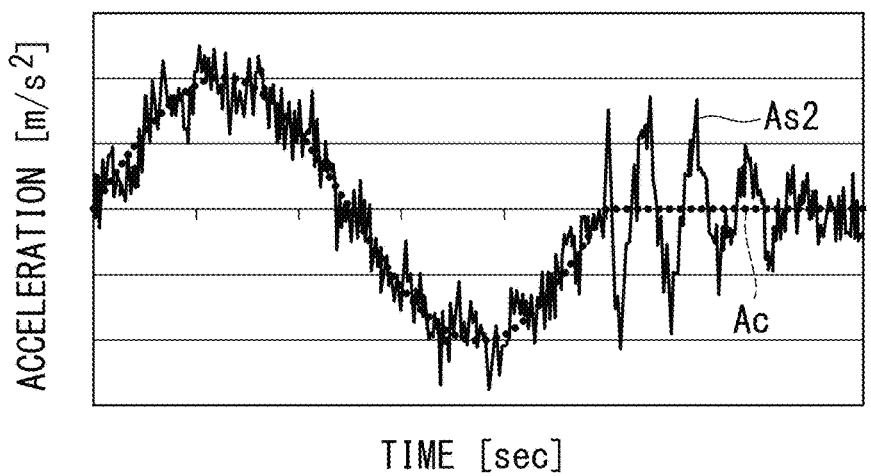
FIG. 4 is a graph showing an example of corrected acceleration calculated from data in FIG. 3.

The correction amount calculation unit 23 subtracts the gravitational acceleration from the sensor acceleration As1 to calculate time-series data of corrected acceleration As2 shown in FIG. 4. Thereafter, the correction amount calculation unit 23 applies a low-pass filter to the corrected acceleration As2 to remove electrical noise. As shown in FIG. 2, the correction amount calculation unit 23 uses calibration data of the acceleration sensor SN for the acceleration from which noise is removed to calculate first acceleration data (first time-series data) As3. The correction amount calculation unit 23 calculates a difference obtained by subtracting the second acceleration data Ac from the first acceleration data As3 shown in FIG. 5 as the vibration correction amount Ad1 shown in FIG. 6, and stores the vibration correction amount Ad1 in the storage unit 25.

The correction amount update unit 24 updates the vibration correction amount Ad1 calculated by the correction amount calculation unit 23 as a new vibration correction amount stored in the storage unit 25 each time the operation program is executed.

The determination unit 22 shown in FIG. 1 determines validity of whether the vibration correction amount stored in the storage unit 25 is appropriate about the following three points:
1. A setting value for the internal parameter of the acceleration sensor SN
2. Setting values for the mounting position and posture of the acceleration sensor SN relative to the end effector EF
3. A detection value of the acceleration sensor SN Note that "the above internal parameter and the like" will simply be used below as a collective term for the values of the above three points.

When each motor is driven based on the operation program, the determination unit 22 uses the first acceleration data As3 and the second acceleration data Ac calculated by the correction amount calculation unit 23 to calculate a correlation value c shown in the following expression (1). The determination unit 22 determines validity about the above internal parameter and the like based on the calculated correlation value c.

$$c = \frac{\sum_{k=1}^{n}(a_{ck} \times a_{sk})}{\sum_{k=1}^{n}(a_{ck} \times a_{ck})} \qquad (1)$$

$a_{ck}$: The second acceleration data Ac at each time
$a_{sk}$: The first acceleration data As3 at each time As shown in the above expression (1), as a difference between the first acceleration data As3 and the second acceleration data Ac is smaller, the correlation value c approaches 1. The determination unit 22 uses the following expression (2) including the correlation value c to determine the validity of the above internal parameter and the like.

$$|c-1| \leq \varepsilon \qquad (2)$$

The determination unit 22 determines that validity of the above internal parameter and the like is present when the left side of the expression (2) is equal to or smaller than a preset threshold ε. On the other hand, the determination unit 22 determines lack of the validity of the above internal parameter and the like when the left side of the expression (2) exceeds the threshold ε.

Figure 5:
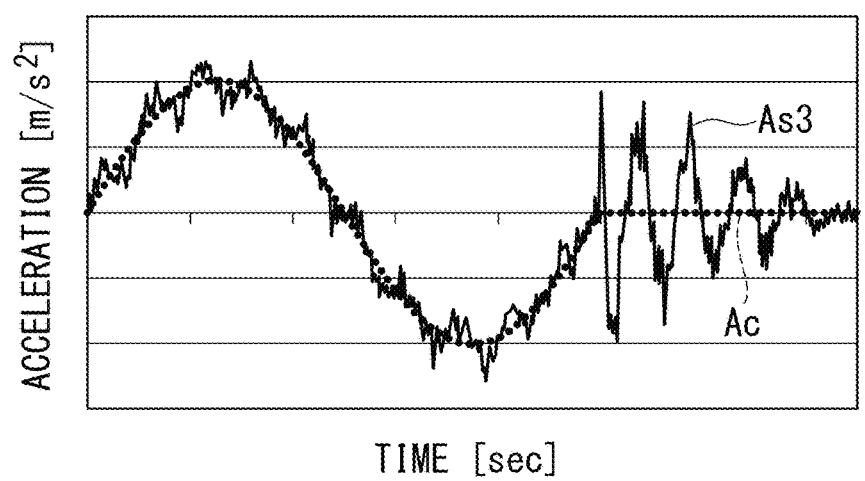
FIG. 5 is a graph showing an example of the first acceleration data calculated from data in FIG. 4.
Figure 6:
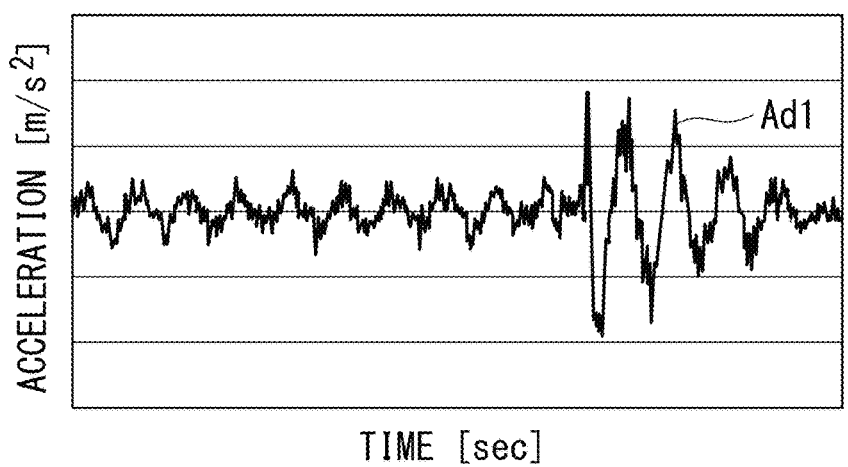
FIG. 6 is a graph showing an example of a vibration correction amount calculated from data in FIG. 5.
Figure 7:
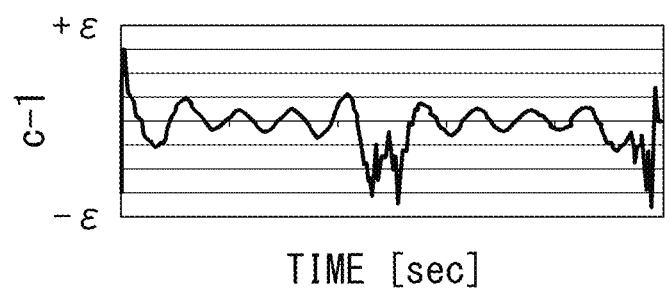
FIG. 7 is a graph showing an example of relation between the correlation value calculated from the first acceleration data and the second acceleration data and a preset threshold.

When the correlation value c calculated using the first acceleration data As3 and the second acceleration data Ac shown in FIG. 5 is substituted into the above expression (2), time-series data shown in FIG. 7 is obtained. As shown in FIG. 7, a value obtained by subtracting 1 from the correlation value c in this case is included in a range from −ε to +ε. Therefore, the determination unit 22 determines that the validity of the above internal parameter and the like in this case is present. Note that the scale of the horizontal axis which is a time axis in FIG. 7 corresponds to a time period in which the command value is varying. That is, the scale of the horizontal axis in FIG. 7 does not include time-series data after the acceleration of the command value has become 0 after completion of variation of the command value, and is therefore different from the scale of the entire horizontal axis in FIGS. 3 to 6.

On the other hand, when the determination unit 22 determines lack of the validity of the above internal parameter and the like, for example, the following three events are conceivable as causes of no validity.

Figure 8:
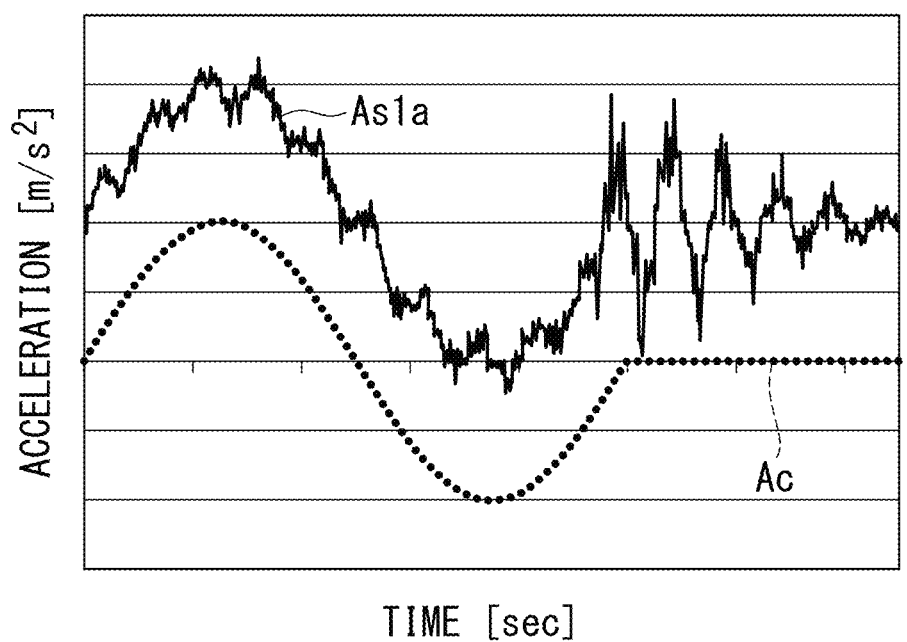
FIG. 8 is graphs showing examples of the detection value of the acceleration sensor and the second acceleration data in a comparative example.
Figure 9:
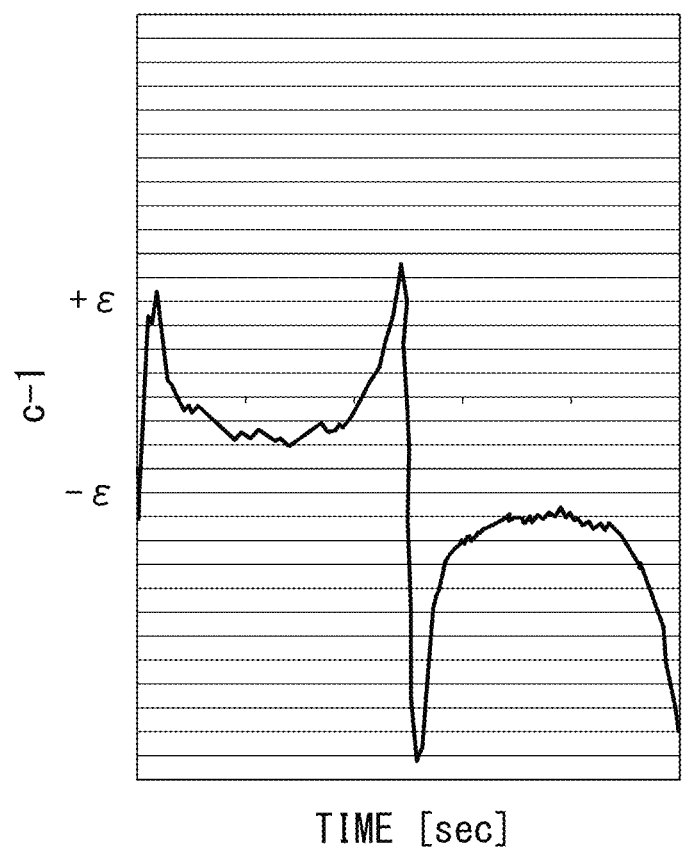
FIG. 9 is a graph showing an example of relation between the correlation value calculated from the first acceleration data and the second acceleration data and the preset threshold in the comparative example shown in FIG. 8.

A. A case where the calibration data of the acceleration sensor SN is inappropriate
B. A case where a setting value for the mounting direction of the acceleration sensor SN is inappropriate
C. A case where the acceleration sensor SN has detected an abnormal value FIG. 8 shows sensor acceleration As1a in a comparative example detected by the acceleration sensor SN in the case of the event A determined to have no validity. Note that the scales of the vertical axis and the horizontal axis in FIG. 8 are the same as the scales in FIGS. 3 to 6, and are also the same as the scales in FIGS. 10 and 12 described later. When the sensor acceleration As1a shown in FIG. 8 is compared with the sensor acceleration As1 shown in FIG. 3, the sensor acceleration As1a is detected to have smaller gravitational acceleration than in reality. Time-series data of the above expression (2) in using the sensor acceleration As1a is shown in FIG. 9, and contains a value larger than +ε and a value smaller than −ε. Note that the scales of the vertical axis and the horizontal axis in FIG. 9 are the same as the scales in FIG. 7, and are also the same as the scales in FIGS. 11 and 13 described later.

Figure 10:
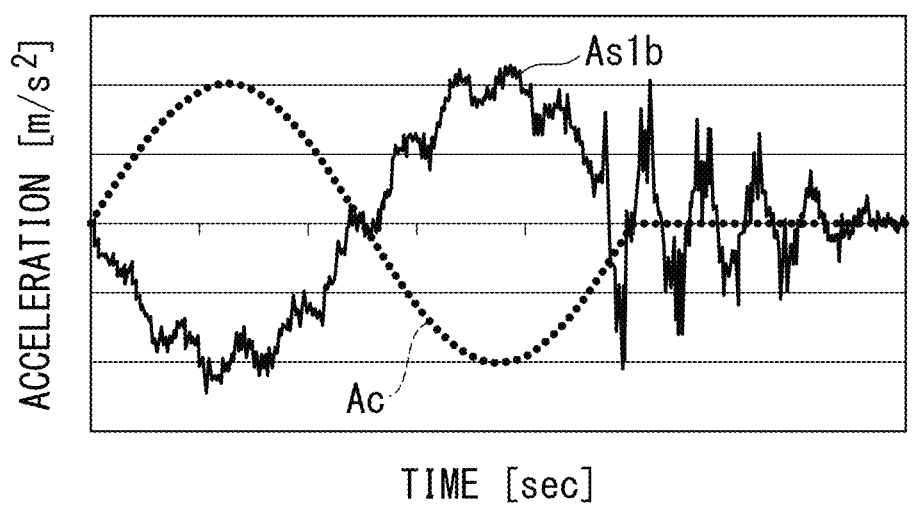
FIG. 10 is graphs showing examples of the detection value of the acceleration sensor and the second acceleration data in a comparative example.
Figure 11:
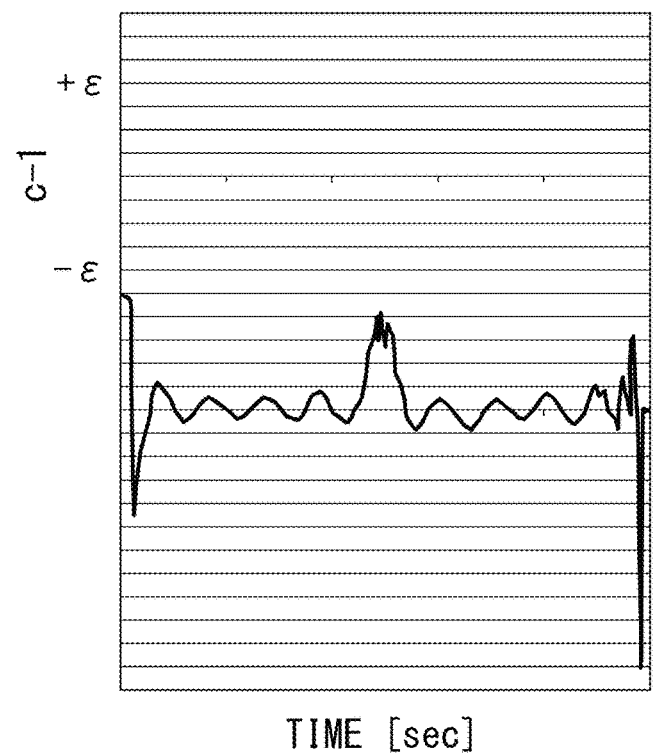
FIG. 11 is a graph showing an example of relation between the correlation value calculated from the first acceleration data and the second acceleration data and the preset threshold in the comparative example shown in FIG. 10.

FIG. 10 shows sensor acceleration As1b in another comparative example detected by the acceleration sensor SN in the case of the event B determined to have no validity. When the sensor acceleration As1b shown in FIG. 10 is compared with the sensor acceleration As1 shown in FIG. 3, the detected direction of the sensor acceleration As1b is completely opposite to the actual direction. Time-series data of the above expression (2) in the case of the event B using the sensor acceleration As1b remains at a value smaller than −ε in the entire range as shown in FIG. 11.

Figure 12:
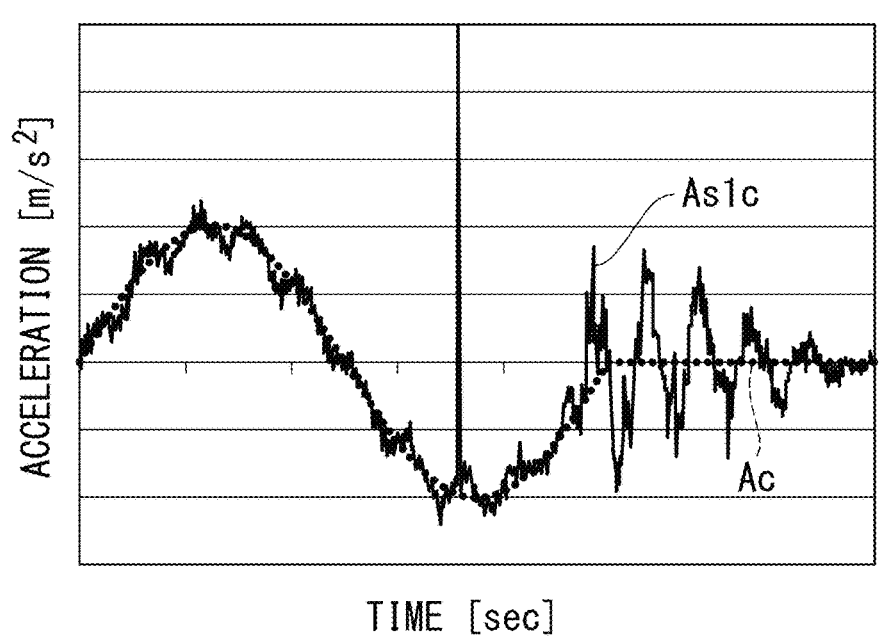
FIG. 12 is graphs showing examples of the detection value of the acceleration sensor and the second acceleration data in a comparative example.
Figure 13:
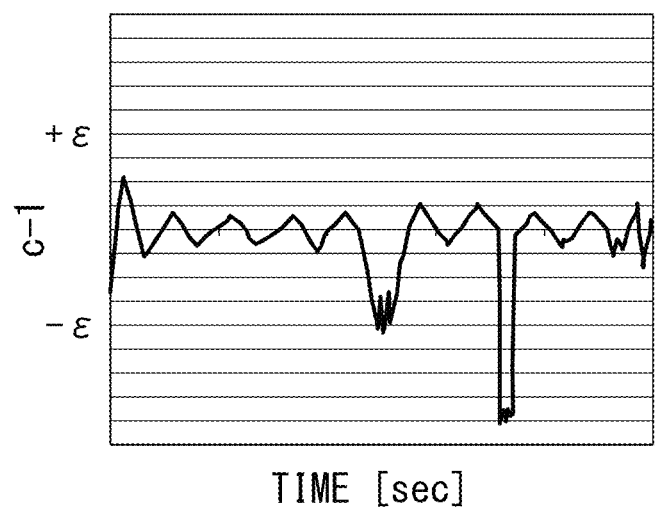
FIG. 13 is a graph showing an example of relation between the correlation value calculated from the first acceleration data and the second acceleration data and the preset threshold in the comparative example shown in FIG. 12.

FIG. 12 shows sensor acceleration As1c in another comparative example detected by the acceleration sensor SN in the case of the event C determined to have no validity. When the sensor acceleration As1c shown in FIG. 12 is compared with the sensor acceleration As1 shown in FIG. 3, the sensor acceleration As1c contains an instantaneous abnormal value around a time point of the smallest amplitude of the command value. Time-series data of the above expression (2) in the case of the event C using the sensor acceleration As1c contains a value smaller than −ε around a time point when the sensor acceleration As1c contains the abnormal value as shown in FIG. 13.

Figure 14:
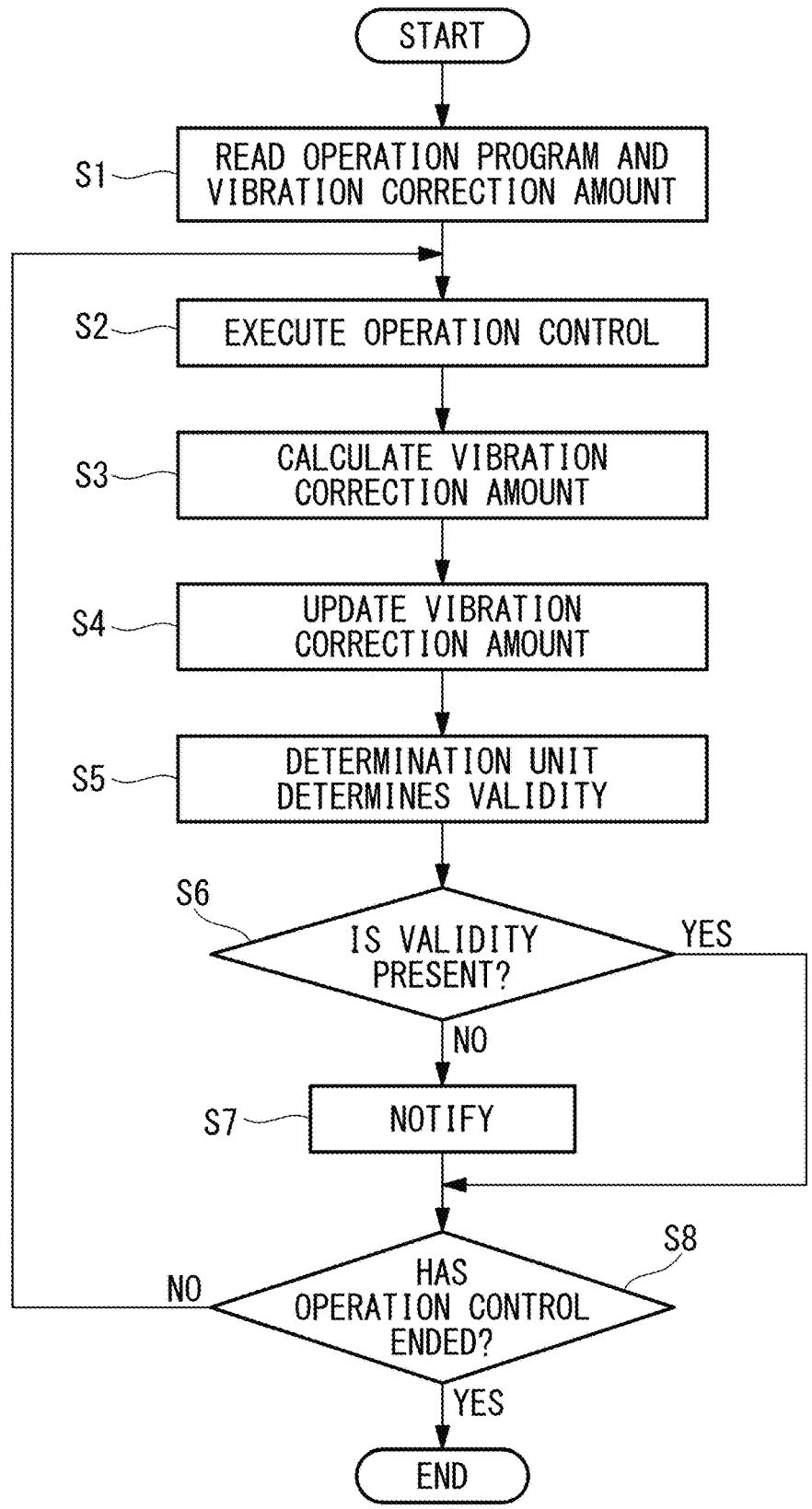
FIG. 14 is a flowchart of a method for controlling a robot.

A method for controlling the robot 10 which is actually performed will be described here in line with a flowchart shown in FIG. 14. First, the operation control unit 21 reads the operation program stored in the storage unit 25 and the vibration correction amount stored in the storage unit 25 at the last execution of the operation program (step S1). The operation control unit 21 executes operation control for driving each motor based on the read operation program and vibration correction amount (step S2).

The correction amount calculation unit 23 calculates the vibration correction amount Ad1 based on the detection value of the acceleration sensor SN detected at execution of operation control and the command value of the operation program (step S3). The correction amount update unit 24 stores the vibration correction amount Ad1 calculated by the correction amount calculation unit 23 in the storage unit 25 as a new vibration correction amount (step S4).

Next, the determination unit 22 calculates the correlation value c based on the detection value of the acceleration sensor SN and the command value. The determination unit 22 substitutes the calculated correlation value c into the expression (2) to determine the validity of the above internal parameter and the like (step S5).

When it is determined by the determination unit 22 lack of the validity (step S6: NO), a notification of no validity is made by the monitor 27 and the speaker 28 (step S7). As a specific notification, an image indicating no validity is displayed on the monitor 27, and a warning sound is output by the speaker 28.

When the process in step S7 is performed, or it is determined by the determination unit 22 in the process of step S6 that the validity is present (step S6: YES), it is determined whether or not to end operation control (step S8), and if not (step S8: NO), the processes from step S2 are repeated.

The operation of the control system 100 according to this embodiment will be described below.

According to the control system 100 related to this embodiment, the operation control unit 21 executes operation control using the command value of the operation program and the last vibration correction amount stored in the storage unit 25. The correction amount calculation unit 23 calculates the vibration correction amount Ad1 using the detection value of the acceleration sensor SN detected by the operation control and the command value. The calculated vibration correction amount Ad1 is stored by the correction amount update unit 24 in the storage unit 25 every time as a new vibration correction amount. At the same time as calculation of the vibration correction amount Ad1, the determination unit 22 uses the correlation value c based on the detection value of the acceleration sensor SN and the command value to determine the validity of at least one of the detection value of the acceleration sensor SN, the setting value for the internal parameter of the acceleration sensor SN, and the mounting position and posture of the acceleration sensor relative to the end effector EF.

That is, when the validity of the above internal parameter and the like is present, vibration of the end effector EF is suppressed by the calculated vibration correction amount Ad1. On the other hand, when the validity is lacking, it is recognized by a user that any of the above internal parameter and the like has not been set appropriately. After modifying a parameter or the like which is not set appropriately, a user can determine an appropriate vibration correction amount Ad1 for suppressing vibration of the end effector EF. In addition, when the validity is lacking, by not performing operation control using the calculated vibration correction amount Ad1, it is possible to prevent in advance an accident and damage that can occur in the end effector EF when vibration has diverged, for example.

Figure 15:
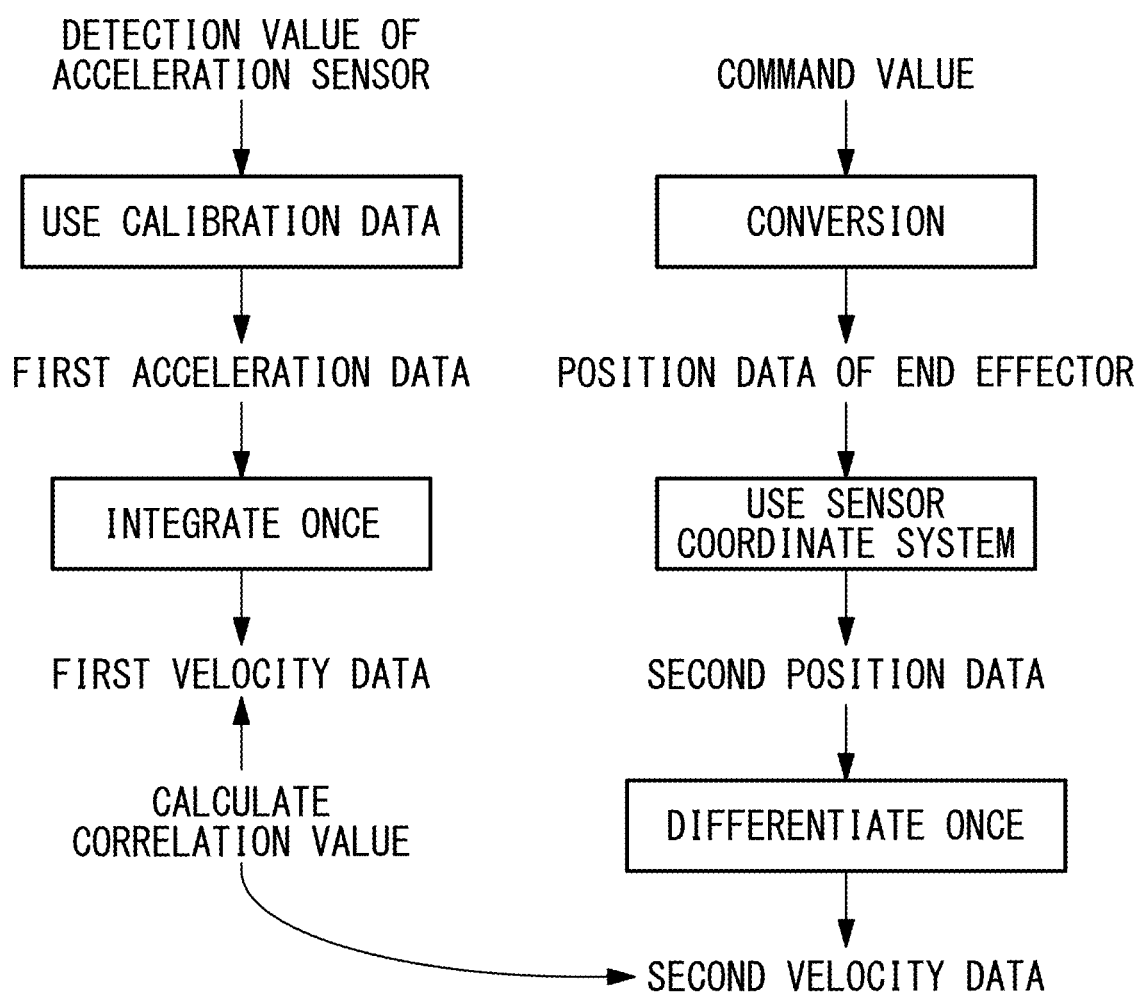
FIG. 15 is a flowchart of a method for calculating the first acceleration data, the second acceleration data, and the correlation value in a modification.
Figure 16:
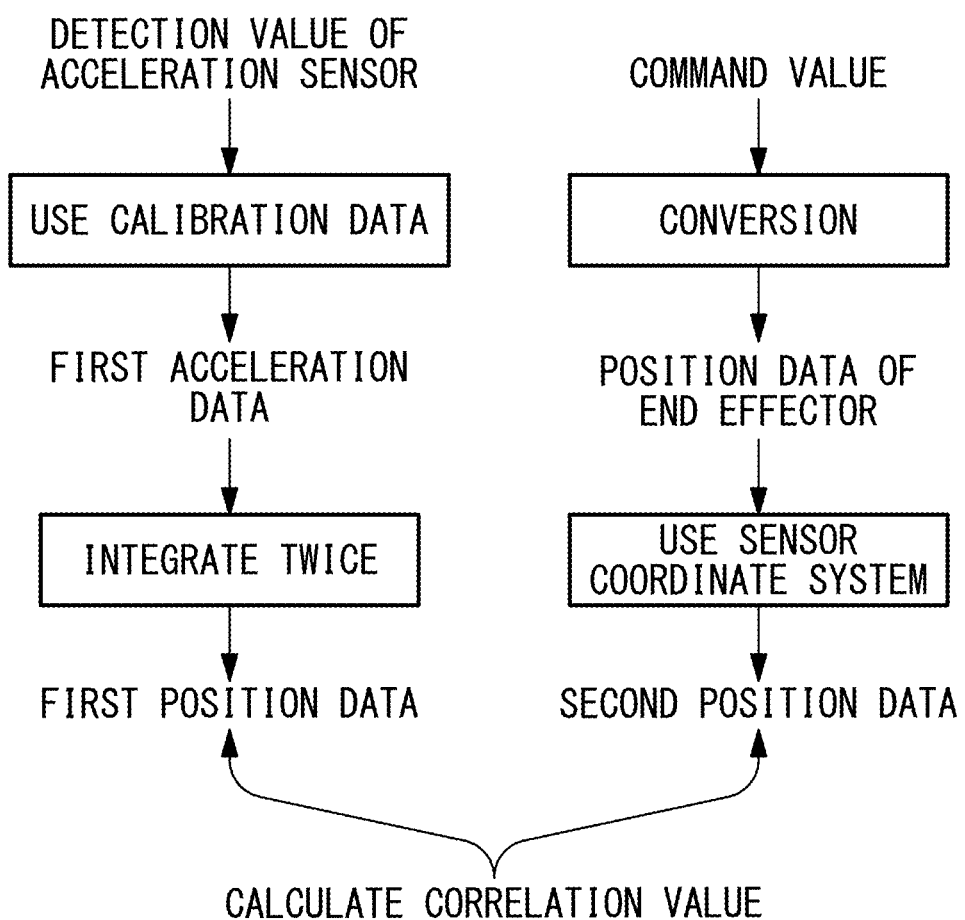
FIG. 16 is a flowchart of a method for calculating the first acceleration data, the second acceleration data, and the correlation value in a modification.

Although the determination unit 22 calculates the correlation value c using the calculated first acceleration data As3 and second acceleration data Ac in the above embodiment, a modification may use other physical amounts such as first velocity data and second velocity data shown in FIG. 15 instead of the acceleration data. In addition, as shown in FIG. 16, first position data and second position data may be used instead of the acceleration data in the embodiment to calculate the correlation value c.

Although the determination unit 22 determines the validity of the above internal parameter and the like by comparing the left side of the expression (2) including the correlation value c with the threshold ε in the above embodiment, a modification may determine the validity using a correlation value different from the correlation value c in the above embodiment. For example, the determination unit 22 may determine the validity of the above internal parameter and the like by determining the sign of a correlation value c2 which is a product of $a_{ck}$ and $a_{sk}$ shown in the expression (3). In addition, the determination unit 22 may determine the validity by combining the correlation value c2 and the correlation value c.

$$c2 = a_{ck} \times a_{sk} \quad (3)$$

Although the determination unit 22 determines the validity of the above internal parameter and the like in the above embodiment, it is possible to further calculate an appropriate setting value for the above internal parameter and the like when it is determined lack of the validity. As an example of a method of calculating an appropriate setting value, the determination unit 22 first rewrites calibration data so that the detection value of the acceleration sensor SN shown in FIG. 1 may be (X, Y, Z)=(−9.8 m/s², 0, 0) in consideration of the gravitational acceleration. The determination unit 22 then calculates the correlation value c again to determine the validity.

As another example, when the mounting position and posture of the acceleration sensor SN relative to the end effector EF are not appropriate, the determination unit 22 may calculate an appropriate posture of the acceleration sensor SN relative to the end effector EF by changing the orientation of the sensor coordinate system Ci to a plurality of orientations using the following expression (4).

$$(W_0 + 10 \times j_1, P_0 + 10 \times j_2, R_0 + 10 \times j_3)[\deg] \quad (4)$$

$W_0$, $P_0$, $R_0$: Initial setting values
$j_1$, $j_2$, $j_3$: Any integer from −17 to +17

The determination unit 22 substitutes 35 ways of numbers for each of $j_1$, $j_2$, $j_3$ in the expression (4) to calculate all the correlation values c in $35^3$ ways of sensor coordinate systems Ci calculated from the expression (4). The determination unit 22 sets a combination of $j_1$, $j_2$, $j_3$ for a correlation value c which minimizes the maximum value of the left side of the expression (2) among the calculated $35^3$ types of correlation values c as a temporary value ($W_1$, $P_1$, $R_1$) of a temporary sensor coordinate system Ci. A rough appropriate orientation of the sensor coordinate system Ci is thus determined in increments of 10 degrees.

Next, the determination unit 22 determines a more detailed appropriate orientation of the sensor coordinate system Ci using the following expression (5) with the temporary value ($W_1$, $P_1$, $R_1$) of the sensor coordinate system Ci as a basis.

$$(W_1 + j_4, P_1 + j_5, R_1 + j_6)[\deg] \quad (5)$$

$j_4$, $j_5$, $j_6$: Any integer from −9 to +9

The determination unit 22 substitutes 19 ways of numbers for each of $j_4$, $j_5$, $j_6$ in the expression (5) to calculate all the correlation values c in $19^3$ ways of sensor coordinate systems Ci calculated from the expression (5). The determination unit 22 sets a combination of $j_1$, $j_2$, $j_3$ for a correlation value c which minimizes the maximum value of the left side of the expression (2) among the calculated $19^3$ types of correlation values c as a temporary value ($W_1$, $P_1$, $R_1$) of a temporary sensor coordinate system Ci. A more detailed appropriate orientation of the sensor coordinate system Ci is thus determined in increments of 1 degree. Note that the determination unit 22 can also determine an appropriate setting value for the mounting position of the acceleration sensor SN by performing similar processing for rotational operation of the acceleration sensor SN.

Although the determination unit 22 determines the validity of the above internal parameter and the like using the correlation value c in the above embodiment and the above modifications, the validity may be determined using other indicators. For example, the determination unit 22 in a modification may apply a smoothing filter such as a moving average filter and a median filter to the first acceleration data As3 and the second acceleration data Ac, and calculate a difference between the two data as an indicator. The determination unit 22 may determine lack of the validity when the indicator has exceeded a preset threshold.

Although the above embodiment has been described taking the robot 10 as an example of the driven body, the driven body should just be an object that moves according to motor driving based on a command value. In addition, although the above embodiment uses the acceleration sensor SN as a sensor for detecting the state quantity of the driven body, it may be, for example, a gyro sensor, a force sensor, a laser tracker, a camera and a motion capture apparatus in other embodiments. A detection value of an encoder may be used as a command value.

From the above-described embodiment, the following invention is derived.

An aspect of the present invention provides a control system including: a driven body driven by a motor; a control apparatus configured to control the motor to operate the driven body; and a sensor mounted on the driven body and configured to detect a state quantity of the driven body at a mounting position, wherein the control apparatus includes: a storage unit configured to store a vibration correction amount for correcting vibration occurring at the mounting position; an operation control unit configured to generate a command value for the motor in each control cycle based on an operation program, and perform operation control of the driven body based on the vibration correction amount stored in the storage unit and the command value; a correction amount calculation unit configured to calculate the vibration correction amount when the operation control is performed by the operation control unit; a correction amount update unit configured to update the vibration correction amount each time the operation control is performed; and a determination unit configured to determine validity of at least one of an internal parameter, the state quantity, the mounting position and posture of the sensor based on the command value and the state quantity each time the operation control is performed.

According to this aspect, the command value is generated by the operation control unit in each control cycle based on the operation program, and operation control of the driven body is performed based on the generated command value and the vibration correction amount stored in the storage unit. Each time the operation control is performed by the operation control unit, the state quantity of the driven body at the mounting position is detected by the sensor mounted on the driven body, and the vibration correction amount is calculated by the correction amount calculation unit, and updated by the correction amount update unit. Then, the validity of at least one of the internal parameter, the state quantity, the mounting position and posture of the sensor is determined by the determination unit based on the command value and the state quantity.

That is, when the internal parameter, the state quantity, the mounting position and posture of the sensor are valid, the vibration correction amount is updated in a direction of suppressing vibration of the driven body, and on the other hand, when they are not valid, vibration is not suppressed effectively, but the validity is determined based on the state quantity detected by the sensor and the command value generated based on the operation program, so that it is possible to quickly recognize that at least one of the internal parameter, the state quantity, the mounting position and posture of the sensor is not valid. This can prevent the driven body from being continuously controlled in a state where any of the internal parameter, the state quantity, the mounting position and posture of the sensor is not valid.

In the above aspect, each time the operation control is executed, the determination unit may calculate a correlation value using first time-series data of a physical amount at the mounting position of the sensor calculated based on time-series data of the state quantity detected by the sensor and the internal parameter of the sensor, and second time-series data of a physical amount at the mounting position of the sensor calculated based on time-series data of the command value and setting values for the mounting position and posture of the sensor, and may determine the validity based on the calculated correlation value.

This configuration calculates the physical amount at the mounting position of the sensor based on two different parameters as the first time-series data and the second time-series data. By comparing the correlation value based on these two parameters, it is possible to easily recognize that at least one of the internal parameter, the state quantity, the mounting position and posture of the sensor is not valid.

In the above aspect, when the determination unit determines lack of the validity, a value determined to be lacking the validity may be corrected among the internal parameter, the state quantity, the mounting position and posture of the sensor.

Since this configuration identifies and corrects a parameter or the like which is not set appropriately, it is possible to quickly appropriately set the internal parameter, the state quantity, the mounting position and posture of the sensor.

In the above aspect, there may be provided a notification unit configured to notify lack of the validity when it is determined by the determination unit lack of the validity.

This configuration enables a notified user to prevent the driven body from being continuously controlled in a state where any of the internal parameter, the state quantity, the mounting position and posture of the sensor is not valid.

In the above aspect, the notification unit may notify a value determined by the determination unit to be lacking the validity among the internal parameter, the state quantity, the mounting position and posture of the sensor.

This configuration enables a user to obtain an appropriate vibration correction amount by using the internal parameter, the state quantity, the mounting position and posture of the sensor which are calculated only from appropriate values.

In the above aspect, the sensor may be any of an acceleration sensor, a gyro sensor, a force sensor, a laser tracker, a camera and a motion capture apparatus.

Another aspect of the present invention provides a method for controlling a driven body including: a step of, based on a state quantity at a mounting position detected by a sensor mounted on the driven body, calculating a vibration correction amount for correcting vibration occurring at the mounting position; a step of storing the calculated vibration correction amount; a step of generating a command value for the driven body in each control cycle based on an operation program, and performing operation control of the driven body based on the stored vibration correction amount and the command value; a step of updating the vibration correction amount each time the operation control is performed; and a step of determining validity of at least one of an internal parameter, the state quantity, the mounting position and posture of the sensor based on the command value and the state quantity each time the operation control is performed.

According to this aspect, when it is determined that the validity of the internal parameter, the state quantity, the mounting position and posture of the sensor is present, the vibration correction amount is updated in a direction of suppressing vibration of the driven body. On the other hand, when it is determined lack of the validity, the validity is determined based on the state quantity and the command value based on the operation program, so that it is possible to recognize that at least one of the internal parameter, the state quantity, the mounting position and posture of the sensor is not valid. This can prevent the driven body from being continuously controlled in a state where any of the internal parameter, the state quantity, the mounting position and posture of the sensor is not valid.

REFERENCE SIGNS LIST

10 robot (driven body)
20 control apparatus
21 operation control unit
22 determination unit
23 correction amount calculation unit
24 correction amount update unit
25 storage unit
27 monitor (notification unit)
28 speaker (notification unit)
100 control system
As3 first acceleration data (first time-series data)
Ac second acceleration data (second time-series data)
Ad1 vibration correction amount
SN acceleration sensor (sensor)
c, c2 correlation value

The invention claimed is:
1. A control system comprising:
a driven body driven by a motor;
a control apparatus configured to control the motor to operate the driven body; and
a sensor mounted on the driven body and configured to detect a state quantity of the driven body at a mounting position;
wherein the control apparatus comprises a processor and a memory that stores a vibration correction amount for correcting vibration occurring at the mounting position, the processor being configured to:
- generate a command value for the motor in each control cycle based on an operation program, and perform operation control of the driven body based on the stored vibration correction amount and the command value;
- calculate a difference, as the vibration correction amount, obtained by subtracting a second physical amount that is a predetermined type of a physical amount of the sensor from a first physical amount that is the predetermined type of the physical amount of the sensor when the operation control is performed, the first physical amount being calculated based on the state quantity detected by the sensor and an internal parameter of the sensor, and the second physical amount being calculated based on the command value and setting values for the mounting position and posture of the sensor;
- update the vibration correction amount each time the operation control is performed;
- calculate, from time-series data of the first physical amount and time-series data of the second physical amount, a correlation value indicating correlation between the first physical amount and the second physical amount; and
- determine validity of at least one of the internal parameter, the state quantity, the mounting position and posture of the sensor by comparing the calculated correlation value with a preset threshold.

2. The control system according to claim 1, wherein when the processor determines lack of the validity, a value determined to be lacking the validity is corrected among the internal parameter, the state quantity, the mounting position and posture of the sensor.

3. The control system according to claim 1, comprising a notification unit configured to notify lack of the validity when it is determined to be by the determination unit lack of lacking the validity, wherein the notification unit comprises at least one of a monitor and a speaker.

4. The control system according to claim 3, wherein the notification unit notifies a value determined by the determination unit to be lacking the validity among the internal parameter, the state quantity, the mounting position and posture of the sensor.

5. The control system according to claim 1, wherein the sensor is selected from the group consisting of an acceleration sensor, a gyro sensor, a force sensor, a laser tracker, a camera, and a motion capture apparatus.

6. A method in a control apparatus that controls a driven body on which a sensor is mounted and that stores a vibration correction amount for correcting vibration occurring at a mounting position at which the sensor is mounted, the method comprising:
- generating a command value for the driven body in each control cycle based on an operation program, and performing operation control of the driven body based on the stored vibration correction amount and the command value;
- calculating a difference, as the vibration correction amount, obtained by subtracting a second physical amount that is a predetermined type of a physical amount of the sensor from a first physical amount that is the predetermined type of the physical amount of the sensor when the operation control is performed, the first physical amount being calculated based on a state quantity of the driven body detected by the sensor and an internal parameter of the sensor, and the second physical amount being calculated based on the command value and setting values for the mounting position and posture of the sensor;
- updating the vibration correction amount each time the operation control is performed;
- calculating, from time-series data of the first physical amount and time-series data of the second physical amount, a correlation value indicating correlation between the first physical amount and the second physical amount; and
- determining validity of at least one of the internal parameter, the state quantity, the mounting position and posture of the sensor by comparing the calculated correlation value with a preset threshold.

\* \* \* \* \*